United States Patent [19]

Medina

[11] Patent Number: 4,832,002

[45] Date of Patent: May 23, 1989

[54] UNIFIED HELIOSTAT ARRAY

[76] Inventor: Oscar Medina, 1366 W. Garden Cir., Mesa, Ariz. 85201

[21] Appl. No.: 74,624

[22] Filed: Jul. 17, 1987

[51] Int. Cl.[4] .............................................. F24K 2/38
[52] U.S. Cl. .................................... 126/425; 136/246; 353/3
[58] Field of Search ................ 126/424, 425; 136/246; 353/3

[56] References Cited

U.S. PATENT DOCUMENTS

| | | | |
|---|---|---|---|
| 3,924,604 | 12/1975 | Anderson | 126/424 |
| 4,056,313 | 11/1977 | Arbogast | 353/3 |
| 4,102,326 | 7/1978 | Sommer . | |
| 4,172,443 | 10/1979 | Sommer | 126/438 |
| 4,343,294 | 8/1982 | Daniel | 126/424 |
| 4,585,318 | 4/1986 | Seifert | 126/424 |

Primary Examiner—Carroll B. Dority, Jr.
Attorney, Agent, or Firm—Warren F. B. Lindsley

[57] ABSTRACT

A unified heliostat array for reflecting the rays of the sun upon a central collector. The heliostats are driven by a single pair of drive motors that are coupled to a sun tracker and to the individual heliostats by a common pair of drive cables. The common drive capability is made practical through the use of a novel rotational element defined as a transaxial link.

11 Claims, 3 Drawing Sheets

UNIFIED HELIOSTAT ARRAY

BACKGROUND OF THE INVENTION

The rapid expansion of the world's population, coupled with the accelerated technological development of large sectors of the world, has produced a dramatic increase in the demand for energy in all forms, including fuels and electricity for heating, lighting, transportation and manufacturing processes. The construction of hydroelectric facilities, and the development of fossil fuel resources has continued at a rapid rate, but it becomes increasingly evident for a number of reasons that these efforts are inadequate to keep pace with the demands of the growing population.

As means are being sought to meet this growing need for thermal and electrical energy, environmental concerns are seriously impeding the development of new sources based on fossil fuels and nuclear energy. Attention has thus tended to focus on solar energy which is nonpolluting and which has the further advantage that it is not depleted with use.

One promising approach for the collection and conversion of solar energy utilizes a field of reflectors focused on a central collector that is typically mounted atop a tower.

DESCRIPTION OF THE PRIOR ACT

An example of such an installation is the ten-megawatt solar-thermal generating plant constructed by the Southern California Edison Co., as a pilot operation in the Mojave Desert. In this installation, the reflector field consists of a seventy-two acre ellipse paved with mirrors or heliostats. The heliostats are mounted on pedestals using a gimbal mechanism which enables them to be tilted and turned to follow the sun from early morning to late afternoon. All of the heliostats in the reflector field are directed to focus the reflected rays of the sun on a central receiver which is a boiler-like device atop a seventy-meter tower. The concentrated solar radiation boils water in the central receiver, and the steam flows down the tower to drive a turbine that turns an electric generator.

Each heliostat is rotatable about a vertical and a horizontal axis with a separate drive motor provided in each heliostat for each rotational axis. A central computer controls the motion of the entire field of more than 1800 heliostats.

While an arrangement of this type may prove to be effective and appropriate in large commercial installations, its cost and complexity are likely to discourage its application where the power requirements are relatively low, and resources to cover the initial cost are limited. In such cases, the requirement for two drive motors in each heliostat is a serious cost consideration, and the technical complexities of centralized computer control are frequently beyond the capabilities of the installation and maintenance personnel.

One approach that removes the requirement for individual drive motors at each heliostat is to couple the heliostats together mechanically, and then to utilize a single pair of motors to drive the entire array. Such a system is known as a unified heliostat array.

A unified heliostat array (UHA) is a group of heliostats linked mechanically so as to move in unison. The compelling idea behind the UHA is the simpler approach to the problem of guiding the mirrors through the tasks of tracking the sun or any source of radiation, directing the reflected rays to a common point of focus and, when necessary, defocusing the reflected radiation to decrease the intensity at the point of focus. The UHA has only two or three motors per group of mirrors as opposed to the two motors per heliostat in the most recognized configuration which is individually controlled by a central, computerized system.

There have been various designs for heliostats and heliostat arrays on record. These heliostats are often clockwork driven and timed with the diurnal motion of the sun. They use an equatorial mount where the primary axis of rotation is parallel to the earth's axis. Other designs are state-of-the-art computerized versions employing one electric motor for each of the two axes of rotation, azimuth and elevation. The UHA designs of prior art are mirror support structures which are mounted on gimbals linked together with long swinging members. The mirrors are arranged in straight lines by necessity due to the long control arms linking either part of the gimbals or the lower end of the mirror supports. These designs are rather cumbersome and do not allow for a full angular motion of the mirrors. Examples of these are U.S. Pat. Nos. 4,102,326 and 4,056,313.

There are two limitations of the typical unified heliostat array, however, that need to be addressed. First, the mechanical coupling means which usually consists of a system of bars and levers is difficult and expensive to install, and requires a carefully engineered and constructed mounting surface that is either flat and level or precisely formed to the desired contours. Secondly, the commonly used rotational means employing a vertical and a horizontal axis poses a problem in terms of efficient space utilization in the array field. To permit rotation about the vertical axis, the typically square or rectangular reflectors must be spaced apart so that their corners do not interfere with those of adjacent reflectors as they are turned.

The present invention circumvents both of these problems through the provision of an improved unified heliostat array with associated apparatus and mechanisms.

U.S. Pat. No. 4,296,731 discloses a water-borne system employing booster and multiple mirror concentrator collectors for concentrating sunlight on either photovoltaic cells and/or flat plate collectors. Although of interest, this patent does not disclose the dual purpose link disclosed herein.

SUMMARY OF THE INVENTION

In accordance with the invention claimed, an improved solar energy collection apparatus is provided in the form of a unified heliostat array in which an array of heliostats is driven by a single pair of drive motors that are coupled to the individual heliostats and to a sun tracker by a common pair of drive cables. A special rotational link mechanism is incorporated in the heliostat structure to accommodate the cable-coupled drive. This unified heliostat array can not only function as a heliostat, but also in three other capacities. This system can work as a heliotrope, that is, a system that can position an object or an array of objects such as photovoltaic panels to directly face the sun or other source of radiation. In such an array, all of the panels would be tracking the sun together moving in unison. The third version of the heliostat array may be a combination of the first two. Using the very same system and control, a portion of the array may serve in the capacity of heliostats, while the remainder of the array functions as heliotropes simply tracking the sun. The fourth version of the heliostat array may be configured with an added tracking device which would sense and follow a second target other than the sun. This system would be capable of illuminating a moving object with the reflected rays from the sun or other distant source of radiation.

It is, therefore, one object of this invention to provide an improved unified heliostat or heliotrope array or combination thereof for collecting solar energy or for reflecting solar energy to a central solar collector associated with the array.

Another object of this invention is to provide such an array in a form that utilizes a single pair of drive motors to control and direct the total number of heliostats in the array together with a sun tracker that is incorporated in the array.

A further object of this invention is to provide such an array in a form that utilizes a minimum number of drive cables which couple the drive motors to the individual heliostats an heliotropes.

A still further object of this invention is to provide as an element of such a unified array, a heliostat directional control mechanism that is specially adapted to accommodate the unified drive afforded by the single pair of drive motors and the single pair of drive cables.

A still further object of this invention is to provide a unified heliostat or heliotrope array or combination thereof in an inexpensive and technologically simple form so that it may be owned and operated in situations where resources and technology are relatively limited as, for example, in remote communities or underdeveloped countries.

A still further object of this invention is to provide such an array in a form which, by virtue of its special rotational mechanism, is more efficient in its space utilization than is the commonly used mechanism which rotates about a vertical axis.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which.

DESCRIPTION OF THE PREFERRED EMBODIMENT

Figure 1:
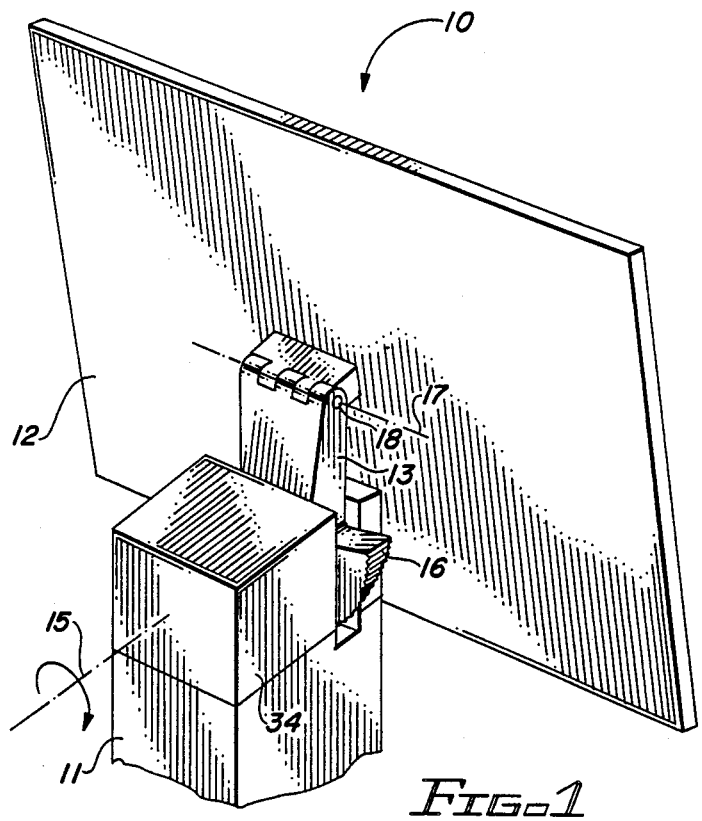
FIG. 1 is a perspective view of a heliostat based on the present invention, and intended for use in the unified heliostat array of the invention.
Figure 2:
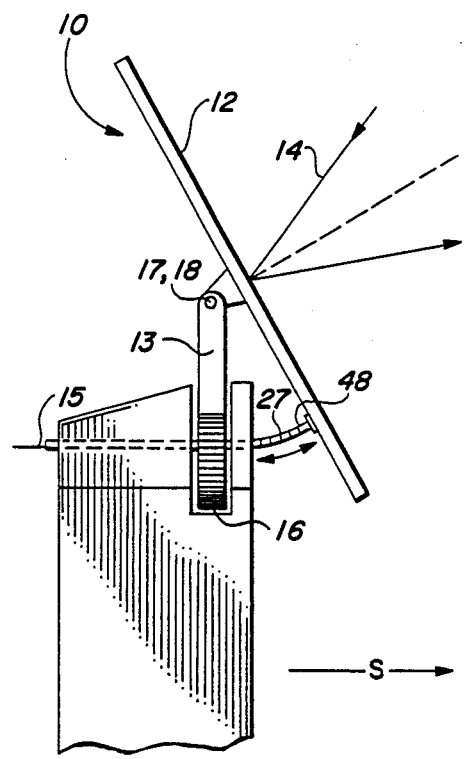
FIG. 2 is a side view of the heliostat of FIG. 1.

Referring more particularly to the drawings by characters of reference, FIGS. 1 and 2 show the external features of a heliostat 10 which constitutes a key element of a unified heliostat or heliotrope array or combination thereof embodying the invention. The heliostat 10, shown in FIGS. 1 and 2, comprises a pedestal 11, a collector or reflector 12, and a transaxial link 13.

Pedestal 11 serves as a stable support for the heliostat and/or heliotrope structure. It may rest directly on the ground or pavement or on the top surface of an enclosed channel that interconnects an array of these devices. The heliostat and/or heliotrope units may be erected along an pattern or layout from rows and columns to staggered positions along curved lines, circles or radials. The units need not even be on the same plane. Uneven terrain or structures may suffice as long as shading or interference does not become a problem. What is required in the relationship between the heliostat and/or heliotrope units is that all of their primary axes be parallel.

On a terrestrial installation, the heliostat and/or heliotrope units may be placed with their parallel primary axes oriented virtually in any direction so long as they remain parallel. Ideally, the axes would be oriented north-south. This is because the greater amount of motion is that which is about the primary axis. But, then again, the flexibility on this point allows the primary axial orientation upon installation to be determined by such things as a magnetic compass or a point on the distant horizon and a leveling device when no other means exists for resolving true north or parallelism. This feature allows this source of energy to be set up by anyone, anywhere.

In each array, one of the heliostat and/or heliotrope units will serve as a sun tracking heliotrope (STH). Atop this unit is a sensing device which determines the position of the sun or other source of radiation relative to two intersecting planes. One of these two planes is parallel to the primary axis of the STH and those of the other heliostat and/or heliotrope units. The other plane which is at a right angle to the first is parallel to the secondary axes of the STH and other heliostat and/or heliotrope units. (The secondary axes, although on parallel planes, may not be parallel in a heliostat array but may be in the heliotrope array.) These two intersecting planes of reference used by a solar sensing device are analogous to the cross-hairs of a sighting or aiming device.

Interconnecting cables coupling the heliostats and heliotropes together are routed through the enclosed channel or through an underground channel running underneath the heliostat and/or heliotrope arrays.

Reflector 12 of the heliostat structures in the first embodiment of the invention is a mirror-type reflector which receives rays 14 of the sun and reflects them toward a central collector associated with the heliostat array.

Transaxial link 13 provides for rotation of reflector 12 about two axes. The first or primary axis of rotation 15 is horizontal and located at the center of a circular or arcuate gear 16. The second axis of rotation 17 is at a pivot pin 18 that secures reflector 12 to transaxial link 13. The two axes 15 and 17 are substantially mutually perpendicular.

In the northern hemisphere, heliostat 10 is preferably faced in a generally southerly direction, as shown in FIG. 2, with axis 15 directed north to south. In such an orientation, if reflector 12 is rotated about axis 17 to a position in which its reflecting surface is parallel with axis 15, its surface will face directly upward when link 13 is at the center of its rotational range about axis 15. Rotation about axis 15 now causes reflector 12 to sweep back and forth between east and west, as it might need to do to follow the sun during the time of the summer solstice. In winter, reflector 12 would need to be rotated toward the south about axis 17 to catch the lower position of the sun. The two mutually perpendicular axes 15 and 17 are thus seen to be capable of providing the required rotational freedom needed to track the sun throughout the year.

Figure 3:
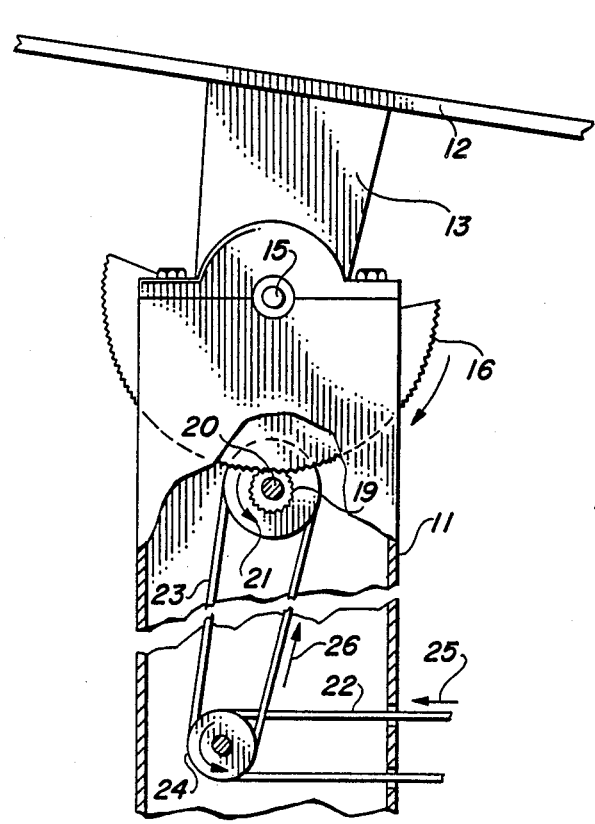
FIG. 3 is a partial rear view of the heliostat of FIGS. 1 and 2 with portions of the structure removed and with other portions of the mechanism only functionally represented.

FIG. 3 illustrates the means by which link 13 and reflector 12 are rotated about axis 15. Link 13, which is rotationally supported within tower 11, is engaged at its geared surface 16 by a small diameter gear 19. Gear 19 is fixed to a shaft 20 which is common to a pulley 21. Pulley 21 is coupled to a common drive cable 22 by a belt 23 and a second pulley 24. Cable 22 and belt 23 may be one continuous member. Thus, as cable 22 moves in the direction 25, pulley 24 is rotated in a counterclockwise (CCW) direction, causing belt 23 to move in direction 26. Pulley 21 and gear 19 are consequently rotated CCW as shown, and link 13 is rotated in a clockwise (CW) direction about axis 15.

Figure 4:
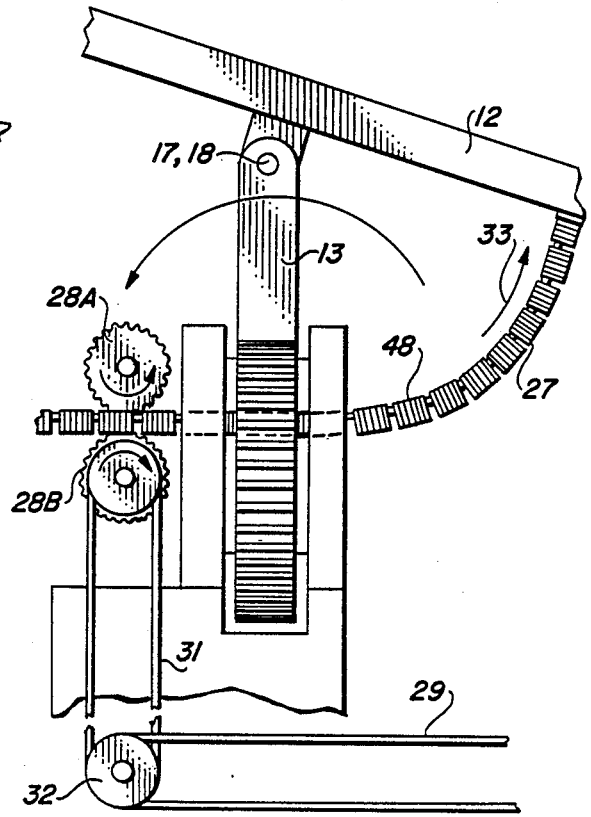
FIG. 4 is a side view of the heliostat of FIGS. 1 and 2, again with portions of the structure removed and with other parts of the mechanism only functionally represented.

As shown in FIGS. 2 and 4, the lower portion of reflector 12 is coupled to a second rotational mechanism inside tower 11 by a hinged linear gear 27. Gear 27 passes through an opening in the rotational center of link 13 at axis 15, and is engaged as it emerges on the far side of link 13 by a pair of gears 28A, 28B, the two gears 28A and 28B operating cooperatively upon gear 27 from opposite sides thereof. Gears 28A and 28B are coupled to a second common drive cable 29 by means of a first pulley (not shown) that is fixed to the axle of gear 28B, by a belt 31 and a second pulley 32. Gear 28A may act as an idler providing a reactionary force against gear 27 a gear 27 is driven by gear 28B.

If gear 28B is now driven in a CW direction as indicated by cable 29, gear 27 is driven to the right as indicated by arrow 33 so that the lower end of reflector 12 is tilted upward.

In FIG. 1, the mechanism (including gears 28A and 28B) for driving gear 27 is covered by a housing 34.

Figure 5:
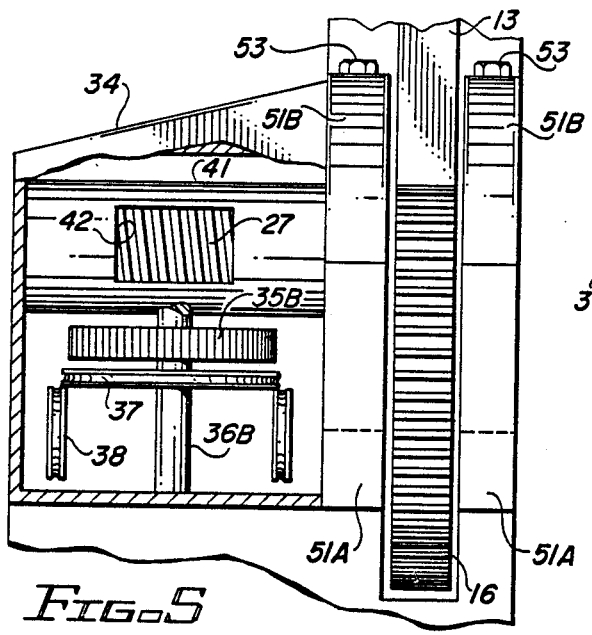
FIG. 5 is a partial view showing heliostat gear arrangements utilized in the directional control of the heliostat when seen from the side of the heliostat as viewed in FIG. 2.
Figure 6:
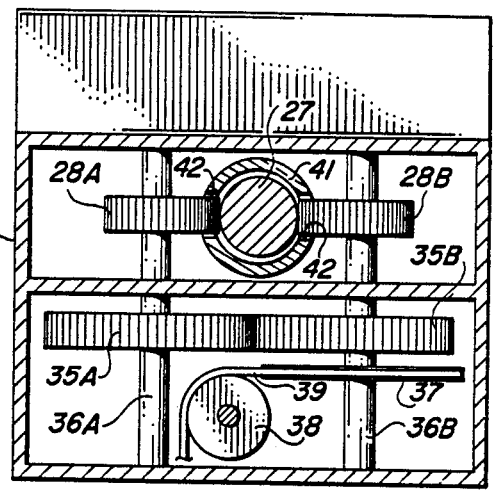
FIG. 6 is another partial view showing the same gear arrangement from the rear of the heliostat.

FIGS. 5 and 6 show in somewhat greater detail, a mechanism for driving gear 27. In this case, gears 28A and 28B have their rotational axes directed vertically. Two additional mutually engaged gears are directly coupled to gears 28A and 28B by common shafts, 36A and 36B, respectively. The two gears 28A and 28B are shown in FIG. 6 to engage opposite faces of gear 27, gear 27 being generally circular in cross section with its teeth extending all about its periphery. A first pulley 37 is fixed to shaft 36B; a second idler pulley 38 has its axis of rotation perpendicular to that of pulley 37 and its periphery is aligned tangentially with the periphery of pulley 37, so that a cable or belt 39 leaving pulley 37 horizontally may lead directly into pulley 38 and then turn vertically downward toward the base of tower 11 where it may again be turned in a horizontal direction by another idler pulley. It is thus seen that the belt or cable 39 may readily constitute the common drive cable for producing rotation about axis 17 in each heliostat of an array comprising a plurality of heliostats 10.

Gear 27 is contained within a hollow cylindrical guide tube 41 inside housing 34, as shown in the side view of FIG. 5. Windows 42 in the sides of guide tube 41 provide entry for the teeth of gears 28A and 28B (gears 28A and 28B not shown in FIG. 5).

Figure 7:
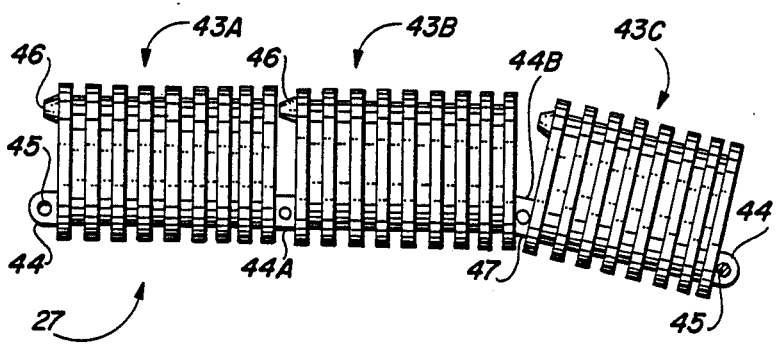
FIG. 7 is a side view of a hinged linear gear provided as an element of the invention for use in the directional control of the heliostat.

FIG. 7 shows three links 43A–43C of hinged gear 27. As indicated earlier, the gear 27 has a circular cross section. Each link 43 (i.e. 43A–43C) may have the general shape of a short cylinder with its length somewhat greater than its diameter, however, any geometrical configuration of the links may be used. The ridges and valleys that form the teeth of gear 27 run circumferentially in planes perpendicular to the axis of the cylindrical form of the gear. The individual links 43 are pivotally coupled in a serial manner to form a flexible linear gear. The pivotal coupling is provided by means of protruding couplers 44 at both ends and at the same side of each link, the protruding couplers 44 engaging in tongue-and-groove fashion the protruding couplers 44 of the abutting links where they are pivotally coupled by pivot pins 45. At one end of each link 43 at the side opposite the coupler 44, a tab or button 46 protrudes which serves as a rotational stop for pivotal motion between the two adjacent or abutting links.

The flexing capability of gear 27 is illustrated in FIG. 7 where links 43A and 43B are shown linearly aligned with each other, while links 43B and 43C are pivoted out of alignment. Tab 46 is shown serving as a rotational limit for pivotal motion in the direction of alignment. Pivotal motion in the opposite direction is limited by the abutting corners, as shown at 47, for links 43B and 43C. The links 43 are specifically dimensioned and formed so that with the maximum degree of misalignment, gear 27 forms an arc 48 of the appropriate radius, as shown in FIGS. 2 and 4.

Figure 8:
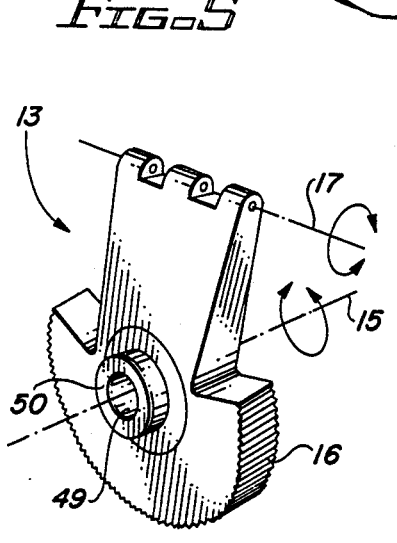
FIG. 8 is a perspective view of a transaxial link that is employed as an element of the directional control mechanism of the heliostat of the invention.

Transaxial link 13, which is a key element of the heliostat control mechanism, is shown in FIG. 8. As seen in FIG. 8, the lower portion of link 13 is a section of a flat arcuate or disc-shaped portion having a gear formed around at least a part of its peripheral edge, while the upper portion resembles one-half of an ordinary door hinge or wedge-shaped portion. The axis of rotation 15 of the lower gear portion extends through its center, and the pivotal axis 17 of the hinge portion extends through one end thereof with both axes being substantially mutually perpendicular. The central opening 49 surrounding axis 15 is not employed as a rotational mounting, but rather as an opening for the passage of gear 27, as may be apparent in FIGS. 2 and 4. The raised circular area 50 surrounding opening 49, and an identical raised area at the opposite side of link 13 are employed for rotational mounting of link 13.

Figure 9:
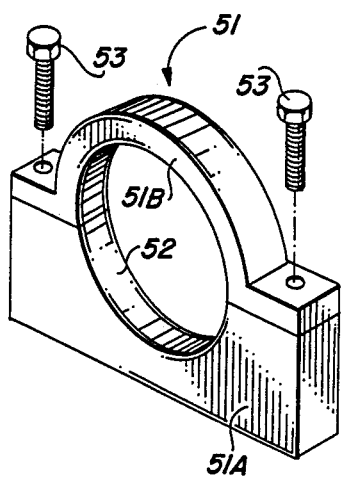
FIG. 9 is a perspective view of a rotational support employed for mounting the transaxial link of FIG. 8.

Two mounting brackets 51, as shown in FIG. 9, are employed in the rotational mounting of link 13. Bracket 51 comprises a rectangular supporting wall with a circular opening 52. The diameter of the opening 52 is appropriate to receive the raised area 50 of link 13 with just enough clearance to permit its free rotation therein.

Some type of bearing, such as a nylon sleeve, interposed between the mating surfaces may be found desirable for enhanced performance and operating life. Bracket 51 is sectioned into a lower or base portion 51A and a cap 51B to facilitate assembly of the heliostat. Two screws 53 are employed to clamp the cap 51B in position over the raised area 50 of link 13.

Figure 10:
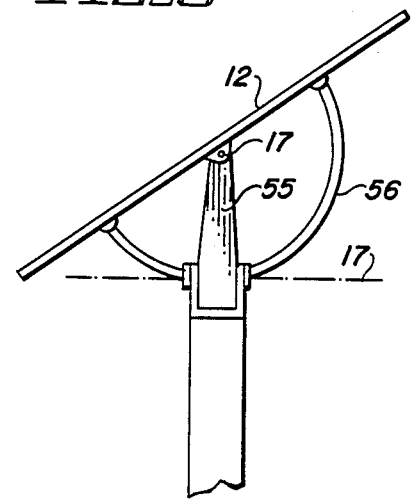
FIG. 10 is a side view illustrating an alternate mechanism for controlling rotation of the heliostat reflector about on axis.
Figure 12:
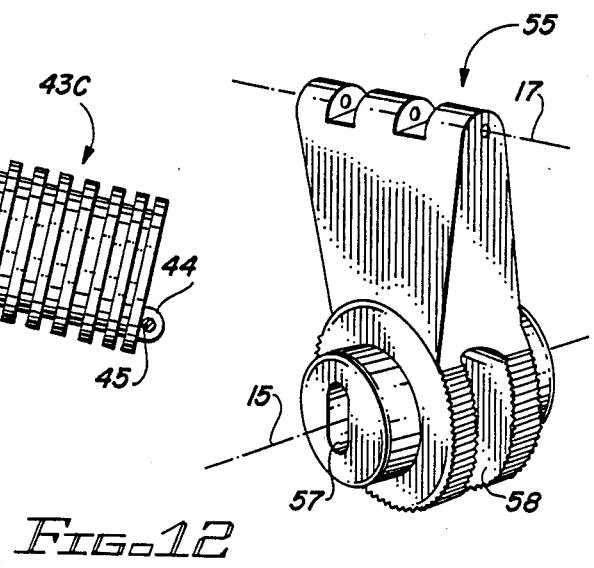
FIG. 12 is a perspective view of a modified transaxial link adapted for use in the mechanism of FIGS. 10 and 11.
Figure 11:
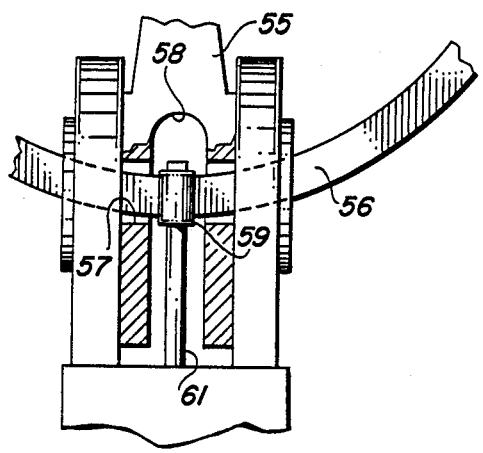
FIG. 11 is an enlarged partial view of the mechanism of FIG. 10 with elements of the structure partially cut away to reveal details of construction.

FIGS. 10, 11 and 12 are illustrative of a second embodiment of the heliostat 10 which employs an alternate means for driving the rotation of reflector 12 about axis 17.

As shown in FIG. 10, the alternate means comprises a transaxial link 55 and a semi-circular bar 56. Bar 56 is secured at both ends to the back side of reflector 12 along its vertical centerline with the two attachment points equally spaced away from the point of attachment of link 55. Link 55 is functionally equivalent to link 13 in the sense that it again provides rotation about the same two mutually perpendicular axes 15 and 17. The pivotal joint or hinge at axis 17 is also the same a that for link 13. As shown in FIG. 12, however, link 55 has an elongated opening 57 in place of the circular opening 49 of link 13.

Link 55 also has a slotted opening 58 that splits the lower portion of link 55 in a plane that vertically bisects link 55 in the plane of axis 17. The opening 57 is elongated to accommodate the curvature of bar 56, and the opening 58 is intended to receive the mechanism that moves bar 56 to rotate reflector 12 about axis 17.

FIG. 11 shows a roller mechanism that moves bar 56 through opening 57. A first rubber or synthetic roller 59 is shown mounted to a vertical shaft 61. The roller 59 engages the near surface of bar 56. An identical roller and shaft assembly is positioned to engage the far surface of bar 56. Both shafts are driven through a pulley train by the common drive cable associated with axis 17 of the multiplicity of heliostats comprising a heliostat array so that as the common drive cable is moved, the rollers 59 move the bar 56 of each heliostat to pivot reflector 12 about axis 17. As shown in FIG. 11, the rollers 59 and the shafts 61 are positioned compactly within slot 58 of link 55. To reduce wear on the rollers 59 resulting from the rotation of the bar 56 around axis 15, the shaft and roller may be splined so that the roller may move vertically upon the shaft as they are rotated.

Figure 13:
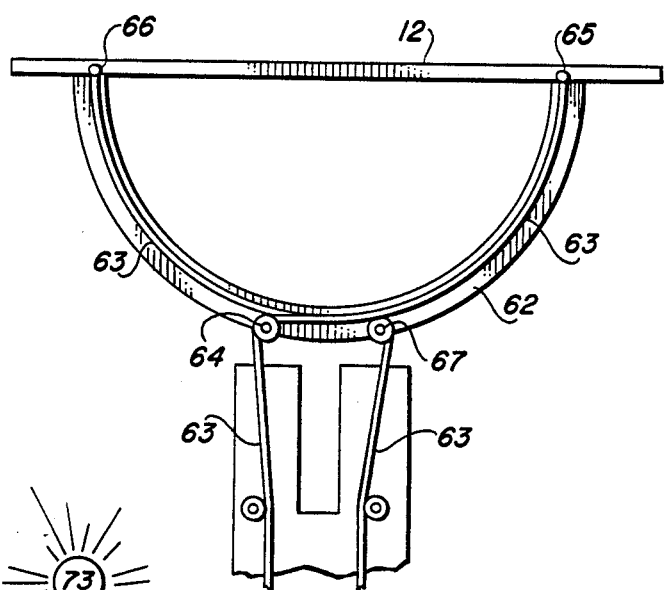
FIG. 13 is an illustration of another alternate mechanism for controlling rotation about the same axis as that involved in the mechanism of FIGS. 10 and 11.

Another alternate means for driving reflector 12 about axis 17 is shown in FIG. 13. In this case, a semi-circular channel 62 replaces bar 56. Channel 62 has a U-shaped cross section that opens to the outside of its semi-circular form. The common drive cable 63 rises vertically from the base of the heliostat pedestal along the left-hand wall of the pedestal, then, at a point at the same level as the lower edge of channel 62, cable 63 turns at an idler pulley 64 to a horizontal path from which it enters channel 62, and follows channel 62 to the point of attachment 65 of channel 62 to the back side of reflector 12. At this point, cable 63 is broken and attached to reflector 12. The other broken end of cable 63 is attached to the opposite end of channel 62 at point 66. From point 66, cable 63 follows channel 62 to its lower edge where it leaves in a horizontal path to pass over another idler pulley 67 where it turns downward toward the base of the pedestal to continue on to the next heliostat of the array. When cable 63 is drawn in one direction or the other, reflector 12 is tilted about axis 17.

Figure 14:
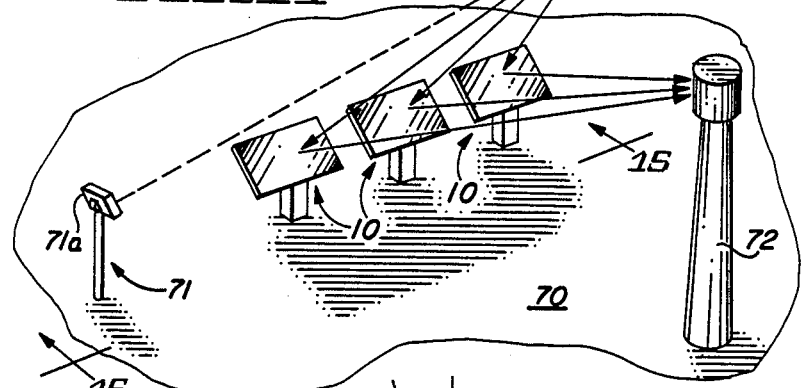
FIG. 14 is a simplified perspective representation of the improved heliostat array of the invention.

FIG. 14 shows a unified heliostat array 70 comprising three heliostats 10, a heliotrope or sun tracker 71 and a central collector 72.

Sun tracker 71 is similar to heliostat 10, but it has a directional solar sensor 71a instead of the reflector 12.

The solar sensor 71a must have the ability to sense the sun through a wide field of view; differentiate the sun from other bright or radiant objects; and must be mounted on the sun tracking heliotrope and must produce directions or signals which will position the heliotrope and itself in direct and exact alignment with the sun. These all serve to track the sun and keep the heliotrope directed as the sun's relative position changes. And, as the sun tracking heliotrope is maintained in direct alignment with the su by virtue of the two-cable drive system, other heliostat and heliotrope units are simultaneously driven in synchronous fashion. At the time of installation, the other heliotropes in the array, if any, are adjusted so their secondary axes are parallel with the secondary axis of the sun sensing heliotrope. The heliostats, at this time, are prefocused individually, while the sun sensor heliotrope is tracking the sun. Once installed, the heliotropes will all track the sun directly, while the heliostats move at half the rate of the sun sensor heliotrope. The cables drive the heliostats at half the speed of the heliotropes by use of half-size pulleys. Cable movement is always proportional to the degree of axial rotation.

The sun tracker is directed toward the sun 73, and tracks the sun by any appropriate means throughout the course of the day. It may be controlled automatically for the more sophisticated systems, or it may be directed manually. Sun tracker 71 utilizes the same type of directional control mechanism as that described for heliostat 10, including a transaxial link 13 or 55. The heliotrope and/or heliostat units are each an articulated structure consisting of the supporting pedestal, the transaxial link and, ultimately, the object which is to be aimed, positioned or directed. This object may be the previously mentioned sensing device, photovoltaic panel, mirror panel, a radar antenna or other means of detecting, utilizing, reflecting or transmitting radiation.

The heliostats 10 may take the form of any of the embodiments described in the present disclosure.

Collector 72 might comprise a boiler mounted at the top of a tower, in which case solar energy focused on the boiler converts water to steam and the steam drives an electric generator. If desired, the collector may comprise a plurality of photovoltaic cells.

Figure 15:
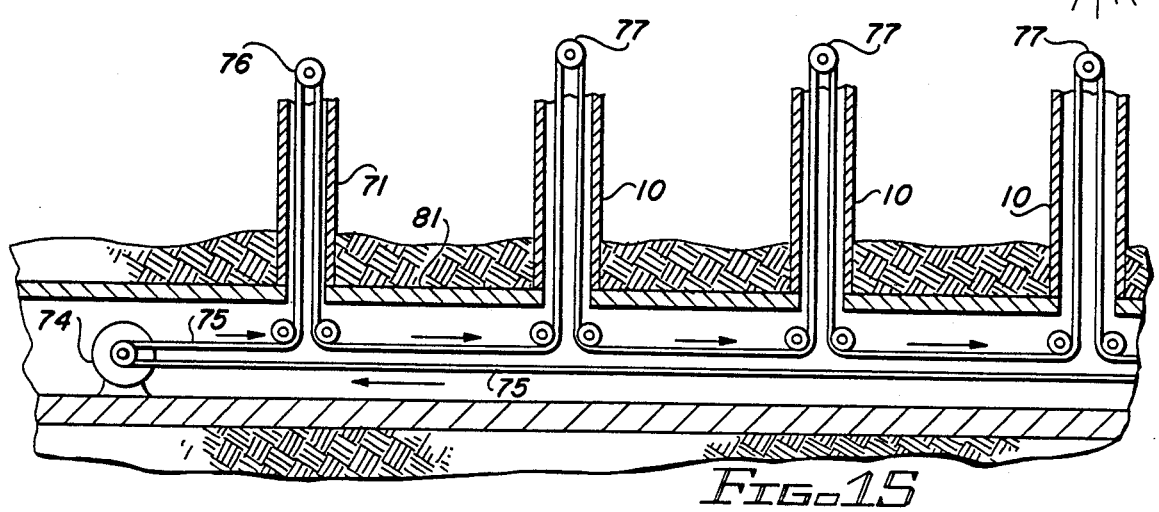
FIG. 15 is a cross-sectional view of the array of FIG. 14 as viewed along line 15—15 of FIG. 14.

FIG. 15 shows an electric motor 74 driving a common drive cable 75. Cable 75 is coupled to the transaxial link of sun tracker 71 by drive pulley 76. Each of the heliostats 10 had a drive pulley 77 that couples its transaxial link to the same drive cable 75. Drive cable 75, as driven by motor 74, provides the required rotation about one of the two rotational axes, 15 and 17. A second drive motor is similarly coupled by a second common drive cable to provide rotation in each coupled unit about the second rotational axis.

In the sun tracker, the drive pulley 76 has a diameter that is half as large as that of the drive pulleys 77 of the heliostats 10. A given displacement of the drive pulley thus produces twice the angular rotation for the sun tracker 71 as for the heliostats 10. This relationship is what is needed to keep the reflected rays from the heliostats focused on the collector 72.

Figure 16:
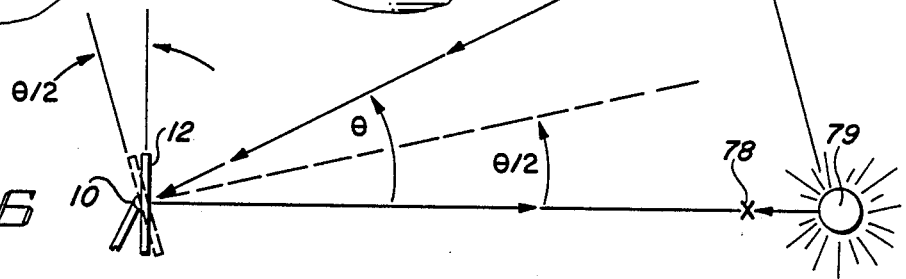
FIG. 16 is a geometric illustration of the relationship between the angular displacement with time of the sun and the corresponding displacement required for the heliostat reflector.

If the sun tracker 71 and the heliostats 10 are initially aligned so that the sun tracker is directed toward the sun, and the heliostats are at the same time directed such that their reflected rays are focused upon the collector 72, the heliostats will continue to focus upon the collector so long as the sun tracker remains trained upon the sun. This is verified by the geometric diagram of FIG. 16, which shows a heliostat 10 with its reflector 12, a collector 78 (represented by the letter X) and the sun in its initial position 79.

In the initial position 79 of the sun, the reflector 12, the collector 78 and the sun lie in a single straight line. The reflector 12 is pointed directly toward the sun and toward the collector 78. Rays from the sun pass over the collector 78, strike the reflector 12 and return upon themselves to focus upon the collector.

If the sun now moves through an angle $\theta$ to a new position 79', the reflector must assume a new position if the reflected rays are to remain focused upon the collector. Because the angle of incidence must equal the angle of reflection, the reflector must rotate through an angle $\theta/2$. Thus, while the sun tracker must rotate $\theta$ degrees to track the sun, the reflectors 12 of the heliostats must rotate $\theta/2$ degrees. This is, of course, true for each of the two axes, 15 and 17.

FIG. 15 shows the drive motor 74 located along with drive cable 75 in an underground channel 81 that passes beneath or adjacent the sun tracker 71 and the heliostats 10. In an alternate arrangement, the sun tracker and the heliostats might be mounted atop an aboveground channel that houses the drive motors and the common drive cables. In yet another alternate implementation, the motors and the cables might be mounted aboveground without the benefit of a protective housing.

It should be noted that the pedestal may be solid, or it may be a hollow structure serving as a conduit for the drive cables as well as supporting the transaxial link. The pedestal may be short and sturdy when only limited angular rotation of the heliostat array is necessary. It may be tall when it is supporting a heliotrope which might have to be swiveled one hundred eighty degrees, horizon to horizon.

Atop the pedestal on two large radius bushings or bearings is mounted the transaxial link. The transaxial link rotates on these bearings about the primary axis. At the other end of the transaxial link is a hinge which supports the panel, sensing device or whatever other device is being aimed or directed. The axis of the hinge is at a right angle to and offset from the primary axis. This axis may be referred to as the secondary axis. It could also be referred to as the latitudinal axis, while the primary axis is referred to as the longitudinal axis, these names being more descriptive. Consequently, the panel may rotate north to south about the secondary axis and also rotate with its transaxial link east to west about the primary axis. Together, in combination, the two axes are effectively able to position the panel or other device toward the sky in any direction.

The disclosed method of tracking with its primary axis oriented horizontally has an advantage over azimuthal tracking which uses a vertical primary axis. The advantage is in the ability to continuously and smoothly track an object which is passing either directly or nearly overhead. In solar applications on earth, this situation occurs at its worst at installations within the tropics. The problem encountered by the azimuthal tracking system in this situation has been named the "keyhole effect" or the "keyhole tracking" problem by engineers some time ago. Solution of the problem using the azimuthal tracking system would require twice changing the direction of this tracker or heliostat about its vertical, or primary, axis. Handling this change in direction would require a sophisticated control system.

The disclosed tracking system does not have this problem in the tropics or in other installations where the sun, or other object which is being tracked, passes overhead.

An improved heliostat array is thus provided in accordance with the stated objects of the invention, and although but a few embodiments of the invention have been illustrated and described, it will be apparent to those skilled in the art that various changes and modifications may be made therein without departing from the spirit of the invention or from the scope of the appended claims.

What is claimed is:

1. An apparatus comprising:
   a pedestal,
   a link providing a first axis of rotation and a second axis of rotation, said first axis of rotation being substantially horizontal and said second axis of rotation being substantially perpendicular to said first axis of rotation,
   said link being mounted upon said pedestal so as to be rotatable about said first axis of rotation,
   said link comprising a flat arcuate, disc-shaped portion having a first gear formed around at least a part of its periphery and a wedge-shaped portion extending therefrom,
   said first axis of rotation extending through the center of said disc-shaped portion and said second axis of rotation extending through an edge of said wedge-shaped portion.
   a panel for receiving rays of the sun,
   said panel being mounted upon said link and rotatable about said second axis of rotation,
   a first means for rotating said link about said first axis of rotation, and
   a second means for rotating said panel about said second axis of rotation,
   whereby said first means and said second means move said panel as appropriate to track and receive rays of the sun.

2. A heliostat comprising:
   a pedestal,
   a link providing a first axis of rotation and a second axis of rotation, said first axis of rotation being substantially horizontal and said second axis of rotation being substantially perpendicular to said first axis of rotation,
   said link being mounted upon said pedestal so as to be rotatable about said first axis of rotation, said link comprising a flat arcuate, disc-shaped portion having a first gear formed around at least a part of its periphery and a wedge-shaped portion extending therefrom, said first axis of rotation extending through the center of said disc-shaped portion and said second axis of rotation extending through an edge of said wedge-shaped portion, a reflector, said reflector being mounted upon said link and rotatable about said second axis of rotation, a first means for rotating said link about said first axis of rotation, and a second means for rotating said reflector about said second axis of rotation, whereby said first means and said second means move said reflector as appropriate to track and receive rays of the sun and to reflect the sun's rays to a collector.

3. The heliostat set forth in claim 2 wherein:

said first means for rotating said link about said first axis of rotation comprises a second drive gear for meshing with said first gear.

4. The heliostat set forth in claim 3 wherein:

said second means comprises a linear gear passing through the axis of rotation of said link and connected at one end to said reflector and meshing at its other end with a third drive gear, said linear gear comprises a plurality of interconnected links axially aligned and pivotally connected for movement into and out of alignment.

5. The heliostat set forth in claim 2 wherein:

said reflector comprises a flat mirror.

6. The heliostat set forth in claim 2 in further combination with:

a collector for receiving the reflected rays of the sun from said reflector.

7. A sun tracker comprising:

a pedestal, a transaxial link providing a first axis of rotation and a second axis of rotation, said first axis of rotation being substantially horizontal and said second axis of rotation being substantially perpendicular to said first axis of rotation, said transaxial link being mounted upon said pedestal for rotation about said first axis of rotation, said transaxial link comprising a flat arcuate, disc-shaped portion having a first gear formed around at least a part of its periphery and a wedge-shaped portion extending therefrom, said first axis of rotation extending through the center of said disc-shaped portion and said second axis of rotation extending through an edge of said wedge-shaped portion, a sun sensor, said sun sensor being pivotally mounted upon said transaxial link and rotatable about said second axis of rotation, a first means for rotating said transaxial link about said first axis of rotation, and a second means for rotating said sun sensor about said second axis of rotation, whereby said first means and said second means direct said sun sensor toward the sun.

8. A heliostat array comprising:

at least a pair of pedestals, at least a pair of transaxial links, one for each pedestal, each link providing a first and a second axis of rotation, said first axis of rotation being substantially horizontal and said second axis of rotation being substantially perpendicular to said first axis of rotation, each link comprising a flat arcuate, disc-shaped portion having a first gear formed around at least a part of its periphery and a wedge-shaped portion extending therefrom, said first axis of rotation extending through the center of said disc-shaped portion and said second axis of rotation extending through an edge of said wedge-shaped portion, at least a pair of reflectors, one for each pedestal, a first means for simultaneously moving the array of said links and the associated reflectors each about the first axis of rotation of the associated link in an arcuate path for tracking the sun, and a second means for simultaneously moving the associated reflectors each about the second axis of rotation of the associated link in an arcuate path for tracking the sun.

9. The heliostat array set forth in claim 8 wherein:

each of said links comprises a flat arcuate disc-shaped portion having a first gear formed around at least a part of its periphery and a wedge-shaped portion extending therefrom, said first axis of rotation of each of said links extends through the center of said disc-shaped portion and said second axis of each of said links extends through an edge of the wedge-shaped portion.

10. The heliostat array set forth in claim 9 wherein:

said first means comprises second drive gear means for meshing with each first gear, and said second means comprises a plurality of linear gear means, one passing through the axis of rotation of each of said links and each connected at one end to the associated reflector and meshing at its other end with a third drive gear means.

11. The heliostat array set forth in claim 10 wherein:

each of said linear gear means comprises a plurality of interconnected links axially aligned and pivotally connected for movement into and out of alignment.

* * * * *